March 5, 1968 F. S. SILLARS 3,371,839
SIDE SEAM SOLDERING MACHINES
Filed July 21, 1964 5 Sheets-Sheet 3
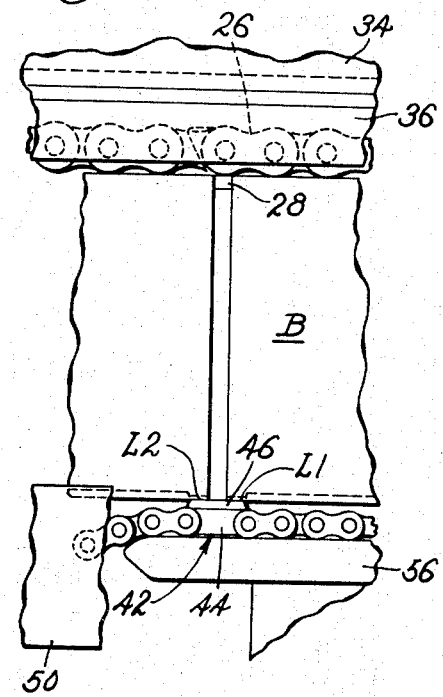
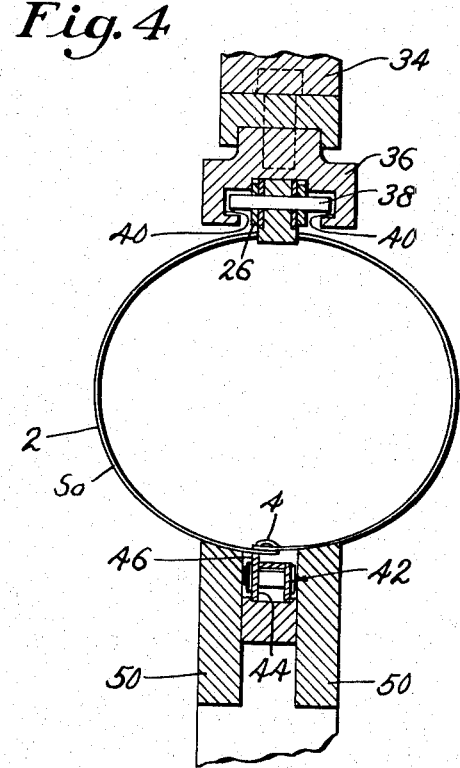
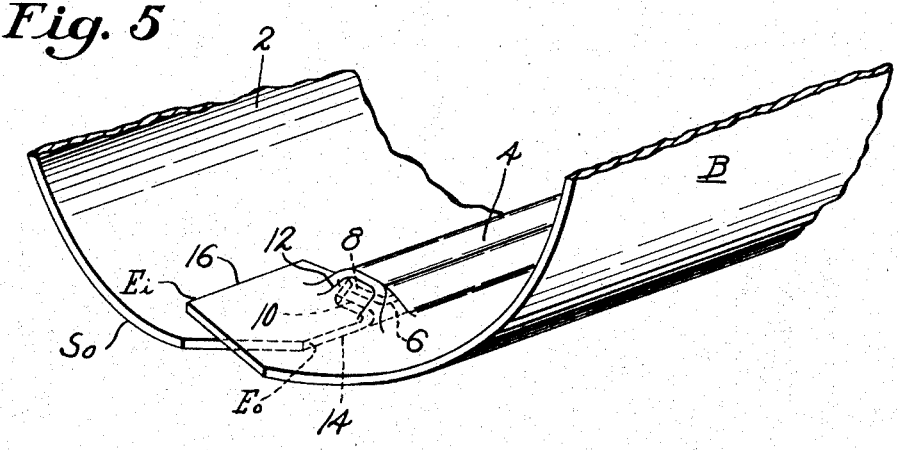

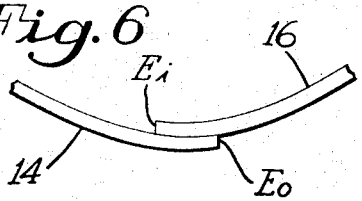
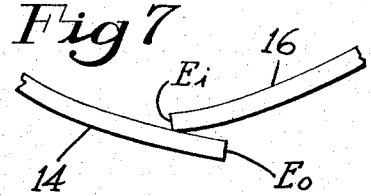
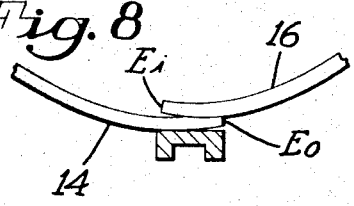
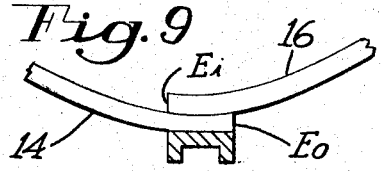
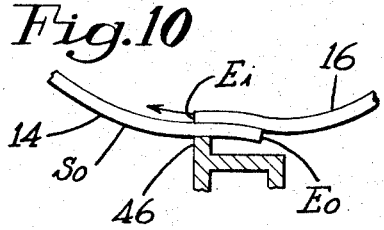
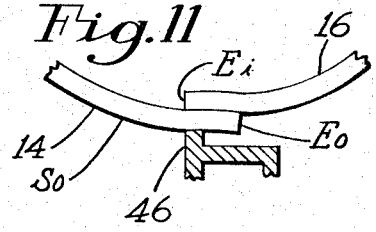
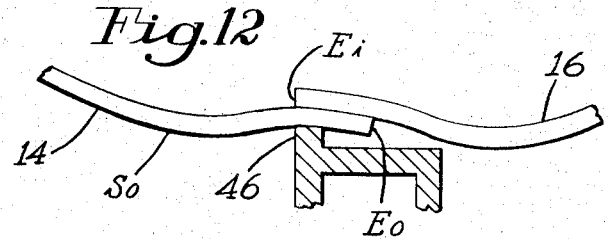
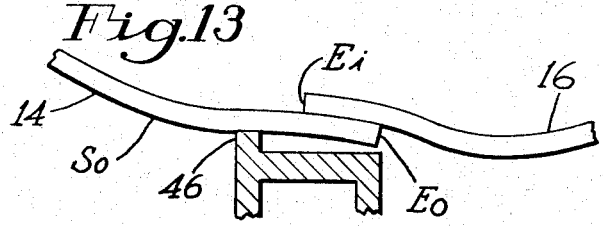

United States Patent Office 3,371,839
Patented Mar. 5, 1968

3,371,839
SIDE SEAM SOLDERING MACHINES
Frederick S. Sillars, Beverly, Mass., assignor to United Shoe Machinery Corporation, Boston, Mass., a corporation of New Jersey
Continuation-in-part of application Ser. No. 348,932, Mar. 3, 1964. This application July 21, 1964, Ser. No. 385,552
9 Claims. (Cl. 228—44)

ABSTRACT OF THE DISCLOSURE

A conveyor chain for use in side seam soldering machines having a plurality of spaced presser lugs which cooperate with feed means for feeding, alining and producing pressure at the overlapping layers of a conventional interlocked container body. The pressure lugs engage the outermost surface of the overlapping portion of the side seam of container bodies at a point spaced from the circumferential terminus of the outer overlapping layer to ensure a close relationship between the overlapping layers of the side seam.

---

This invention relates to can making and, more specifically, to a modified side seam soldering machine of the type illustrated and described in United States Letters Patent No. 3,056,368, issued Oct. 2, 1962, in the name of the present inventor for soldering the seams of partially fabricated containers. This application is a continuation-in-part of an application Ser. No. 348,932, filed Mar. 3, 1964, in the name of the present inventor.

The bodies of cans commonly employed to package most foods are made from a rectangular sheet of tin-coated steel which is formed into an open ended cylinder by interlocking narrow marginal portions of opposite parallel edges of the rectangle to produce a juncture called the side seam. The interlocking side seam extends lengthwise of the cylindrical body to a point inwardly of each of the open ends where the marginal portions of the edges are secured by a lap seam. In cross-section, measured radially of the can, the interlocked side seam includes four layers of metal. However, in cross section the lap joints, heerinafter referred to as the "laps," comprise two layers of metal in the form of overlapping tabs. The purpose of the laps is to facilitate the attachment of the top and bottom of the can body.

The top and the bottom or "ends" as they are frequently called, are attached by flanging outwardly an annular margin adjacent the open ends of the body and then curling the flanged margin into an interlocking formation with the adjacent edge portion of the top and bottom to form therewith what is known as the "double seam." If the interlocked side seam extended to the ends of the can, four folds of metal would have to be flanged and doubled over to be included in the double seam with the top and bottom. However, by terminating the interlocking side seam short of the ends and providing the thinner lap joints only two layers of body material need be flanged outwardly instead of four.

Can bodies of the type generally described above may be fabricated on either a wing-type body-maker or a roll-form body-maker. The laps normally produced on a wing-type body-maker have a gap between the layers. The roll-form body-maker ordinarily produces laps which are not gapped.

The above-referenced United States patent is directed to a method of and apparatus for soldering cans having overlapping layers or tabs which normally tend to gap, i.e. can bodies fabricated on wing-type body-makers. The gap is located only in the portions of the juncture which have been referred to as the laps. The commonly employed wing-type body-maker produces a can body having a side seam as described hereinabove with the outer layer of the laps being displaced from the inner layer, as illustrated in FIG. 7 of the referenced patent. The laps must be closed in order to provide a merchantable can, to facilitate uniform solder application and prevent excessive deposits of solder, and to maintain the thickness of the lap area at a minimum. The gaps are closed or the outer layer compressed in the apparatus of the referenced patent by an endless chain having compressor lugs engageable with the trailing overlapping outer layer of one can body simultaneously with the leading overlapping outer layer of the succeeding body thereby to compress the laps. This operation is performed subsequent to the application of solder and during the solidification process.

The compressor lugs of the referenced patent also serve as a base or support for the can body during its traverse of the solidifying section of the apparatus. A can body is conveyed past the solidifying instrumentalities, such as a spray mist, by the cooperative action of an endless chain having feed dogs engageable with the trailing end of the cylindrical can bodies and the endless chain on which the compressor lugs are located. The relative position of the compressor chain is such that a can located thereon is compressed between the compressor chain and the feed chain thereby to ensure continuity of can body location. Pivotal movement of the can body is effectively prevented as the can body is mounted on the compressor lugs which bear against opposite ends of the can body along the side seam.

As illustrated in FIG. 4 of the referenced patent, the patented compressor lugs engage the outer layer of a lap along the entire circumferential length of the overlapping portion. That is, the compressor lug initially engages the end of the outer, gapped layer and urges this layer toward the inner layer. During the closure of the gap, the lug progressively engages a greater portion of the outer layer as the outer layer is flexed into contact with the inner layer. Normally, when closure of the gap is completed, the lug is in engagement with the outer layer from a point directly below the end of the inner layer to the terminus of the outer layer, see FIG. 4.

The compressor lugs described above are highly successful where the body-maker produces can bodies having substantial continuity in gap size. However, when can bodies having enlarged gaps were introduced to the apparatus, the lugs often do not complete the closure. Furthermore, when the gaps are less than those normally encountered, the lugs close the initial gap but commonly open a gap on the inside of the can body by displacement of the inner layer. A result of this deficiency is improperly soldered cans which have to be discarded.

When can bodies manufactured on roll-form body-makers i.e. can bodies which do not have a gap in the laps, are soldered on the apparatus delineated in the referenced patent the compressor lugs cause the inner layer of the lap to be displaced thereby producing an opening or gap on the inside of the can body at the laps. That is, the pressure exerted on the closed laps by the compressor lugs is transmitted to the inner layer of the lap and urges the inner layer inwardly away from the outer layer. The technical explanation for this result is that the inner layer is displaced an amount sufficient to effect an equating force equal and opposite to that applied by the lugs in the compression of the can body. This explanation also applies to can bodies manufactured on wing-type body-makers wherein the gap is less than normal. That is, when the small initial gap is closed, the same situation prevails as with can bodies fabricated on roll-form body-makers.

When a can body is initially gapped within the normal tolerance for wing-type body-makers the forces are substantially equated in closure.

The removal of the compressor lugs from the compressor chain does not provide a solution to the problem when the apparatus of the referenced patent is employed to solder the side seam of can bodies fabricated on roll-form body-makers. Removal of the compressor lugs would eliminate the gapping of thes inside layer but would result in another problem which would render the apparatus inoperative. As stated above, the lugs assist in maintaining the can body in alined position. The can body must be contacted at two or more displaced locations in order to ensure alinement integrity. If the can body were allowed to ride on the chain links, random movement would be possible. Stationary base members or support means are also not adequate as they would result in the marking or scraping of can bodies that were moved over them. The base or support member must move at the same rate of speed as the feed chain in order to prevent damage to the can bodies. Furthermore, removal of the compressor lugs would obviously prevent use of such a conveyor chain on gapped laps.

The ultimate solution is the provision of a chain which can be utilized on all can bodies having laps regardless of the presence or extent of gapping.

Accordingly, it is an object of this invention to provide apparatus for soldering an article having a side seam and laps.

It is a further and more specific object of this invention to provide apparatus for closing the overlapping portion of soldered articles and holding them closed after solder has been applied and while it is solidifying regardless of variations in the size of the initial gap between the overlapping layers.

It is still a further object of this invention to provide apparatus for applying solder to an article having a side seam with closed laps and associated means for conveying the article on said apparatus without altering the character of the laps.

A correlative object of the two preceding objects is to provide a conveyor chain having presser means which can be employed with can bodies manufactured on both a wing-type body-maker or a roll-form body-maker.

The present invention is directed to a modification of the machine disclosed in the above referenced patent to facilitate the side seam soldering of can bodies manufactured on either the wing-type body-maker or the roll-form body-makers. The presser lugs of the subject disclosure ensure closure of laps having a gap size within a substantially increased tolerance range.

To these ends there is provided in a machine for soldering an article having feed means for moving the article along a predetermined path of travel, which means are illustrated hereinafter as an endless feed chain having feed dogs engageable with the trailing end of the articles and means for applying solder to the seams of the article, a feature embodied in support means cooperative with the feed means to feed the article, maintain alinement thereof, and to establish and/or maintain physical contact between the overlapping layers of the laps, the support means comprising an endless chain having a plurality of presser lugs linked therein comprising an upstanding member extending from one side thereof engageable with the outermost surface of a can body at the outer layer of a lap in substantial alinement with the end of the inner layer of the lap or with the outermost surface of the can body along a line circumferentially disposed from the end of said inner layer in a direction away from the end of the outer layer of the lap.

There is also provided, in accordance with a further feature of this invention, in a machine of the type described in the preceding paragraph support means comprising an endless chain having a plurality of presser lugs linked therein comprising an upstanding member extending from one side thereof engageable with the outermost surface of a can body at the outer layer of a lap in substantial alinement with the end of the inner layer of the lap or with the outermost surface of the can body along a line circumferentially disposed from the end of said inner layer in a direction away from the end of the outer layer of the lap, and stabilizing members mounted on said chain each member being engageable with the can body at a point circumferentially disposed from the side seam on the side opposite that engaged by said presser lugs.

The above and other features of the invention including various novel details of construction and combinations of parts will now be more particularly described with reference to the accompanying drawings and pointed out in the claims. It will be understood that the machine embodying the invention is shown by way of illustration and not as a limitation of the invention. The principles and features of this invention may be utilized in varied and numerous embodiments and applications without departing from the scope of the invention.

In the drawings,

FIG. 3 is a detail view in side elevation on enlarged scale and with portions partially broken away of a portion of the machine shown in FIG. 1 including the feed means;

FIG. 4 is a sectional view taken on the line IV—IV of FIG. 3;

FIG. 5 is a perspective view partly broken away of a can body showing the interlocking and overlapping portions of the side seam;

FIG. 6 is an end view of a portion of a can body of the type manufactured on roll-form body-makers;

FIG. 7 is an end view of a portion of a can body of the type manufactured on wing-type body-makers illustrating an abnormally large lap gap;

FIG. 8 is an end view similar to FIG. 6 showing the compressor lug of the above-referenced patent in contact with the overlapped portion;

FIG. 9 is an end view similar to FIG. 7 showing the compressor lug of the above-referenced patent in contact with the overlapped portion;

FIG. 10 is an end view similar to FIG. 6 showing the presser lug of the present invention in engagement with the outer layer of the lap;

FIG. 11 is an end view similar to FIG. 7 showing the presser lug of the present invention in engagement with the outer layer of the lap;

FIG. 12 is an enlarged view of the inner and outer layers of a lap showing the effect of the presser lug of the present invention thereon, the flexing of the layers being slightly exaggerated for purposes of illustration;

FIG. 13 is a view similar to FIG. 12 showing engagement of the presser lug at another point in the engagement locus;

Figure 1:
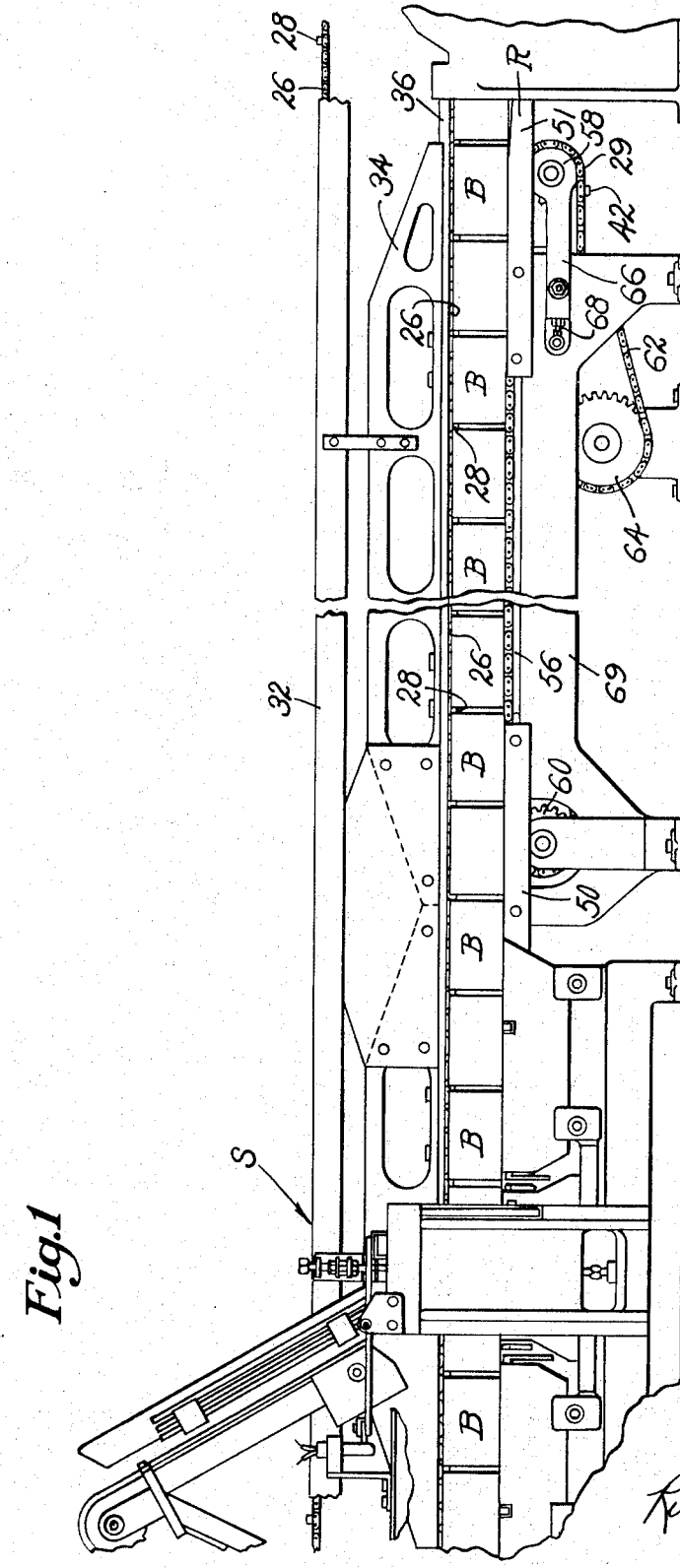
FIG. 1 is a side elevation, with portions partially broken away, of a machine embodying the invention.

The body portion B of a can having laps is best seen in FIG. 5 and includes a cylindrical wall 2 with an interlocking side seam 4 comprising the usual inside hook 6, outside hook 8 and end lock projection 10 located beneath the end lock step 12. Between the side seam and the ends of the can (only one of which can be seen in FIG. 5) are located the outside and inside layers 14 and 16 of the laps, respectively. The inside layer 16 is a tab-like projection formed from the same edge of the original body material as the inside hook 6. The outside hook 8 is formed intermediate the ends of a can between the outside layers 14 located on opposite ends of the can and along the edge common thereto. The inside hook 6 and outside hook 8 are interlocked and "bumped" into close relationship to form the side seam 4. The outside and inside layers 14 and 16 of the laps, respectively, may be either closed or gapped depending upon what type body-maker is employed, as discussed above.

As illustrated in FIG. 1, can bodies introduced to the machine are conveyed from left to right in a timed and spaced order by an endless conveyor chain 26 having feed dogs 28 located at intervals thereon, each dog being engageable with the trailing end of one can body. The bodies are conveyed past a soldering station S preferably of the type illustrated and described in United States Letters Patent No. 3,000,338, issued Sept. 19, 1961, in the name of the present inventor. The soldering station, per se, forms no part of the present invention.

After solder has been applied at the soldering station S the can bodies must be removed from the station and supported for movement through a solidifying stage to a removal station R. When a gap exists in the laps of a can body, the gap must be closed. However, means must also be provided which will prevent the creation of gaps.

Figure 2:
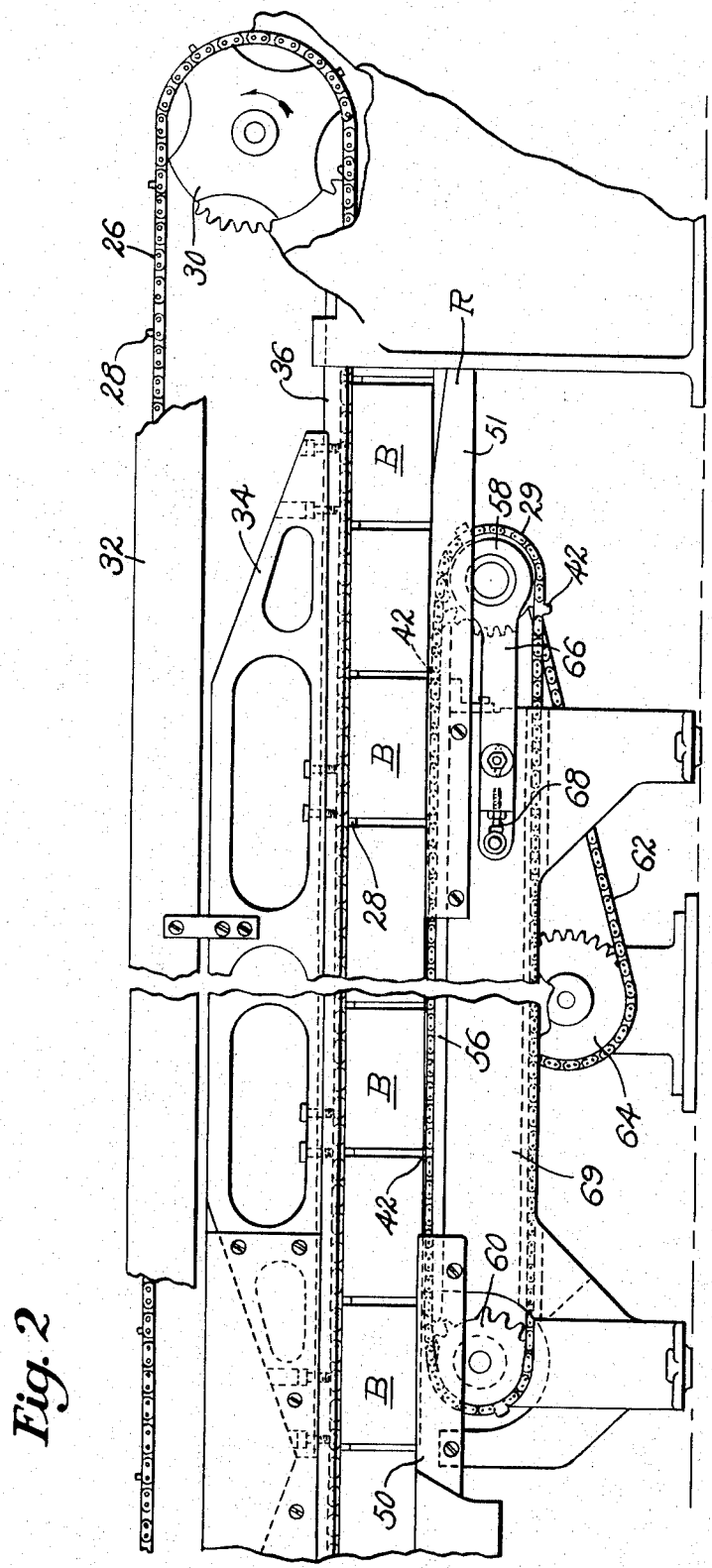
FIG. 2 is a side elevation on an enlarged scale of a portion of the machine shown in FIG. 1.

As illustrated in FIGS. 1 and 2, the conveyor chain 26 and a support chain 29 cooperate to remove can bodies B from the solder station and to convey the can bodies to the removal station R. The can bodies remain in position between the conveyor chain 26 and the support chain 29 for a predetermined period sufficient to allow uniform solder solidification. Controlled artificial means such as a water spray may be provided to effectuate a desired rate of solidification. Although it is considered preferable to provide such artificial solidification means, provision thereof, per se, forms no part of this invention.

The conveyor chain 26 passes around a sprocket wheel 30 (FIG. 2) which is driven in a counterclockwise direction. The upper portion of the chain is supported in a guide 32 which is mounted on a machien frame member 34 while the lower portion is supported by a guide 36 which depends from the frame member. Referring to FIG. 4, it will be seen that the conveyor chain is supported in the guide 36 by studs 38 which project from the chain links and slide in guideways 40. It will be noted that the guideway openings, measured vertically, are larger than the diameter of the studs 38. The chain 26 will normally rest by its own weight on a can body but will yield upwardly a slight amount by pressure applied by the can as will become apparent from the description which follows.

The support chain 29 is an endless chain having a plurality of presser lugs 42 linked therein. The presser lugs 42 comprise chain links 44 having an upstanding member 46 extending from one side thereof, as viewed in FIGS. 4, 10 and 11. The upstanding member 46 on each lug 42 is engageable with the outermost surface $S_o$ of a can body introduced thereto. The functional locus of engagement of a member 46 with the outermost surface $S_o$ of a can body extends from a point alined with the end or circumferential terminus $E_i$ of the inner lap layer 16 (see FIG. 12) along the outermost surface $S_o$ of the can body in a direction away from the end or circumferential terminus $E_o$ of the outer lap layer (see FIG. 13). In the preferred embodiment, the line defined by the points of contact or engagement between the members 46 and the outermost surface $S_o$ of successive can bodies is in alinement with the terminus or ends $E_i$ of the inner layers 16 and spaced from the terminus or ends $E_o$ of the outer layers 14. However, engagement at any point along the above defined locus establishes the desired results to be described hereinafter. The length of the engagement locus is limited by the ability of the member 46 to function as a support. That is, as stated above, the conveyor chain 26 and the support chain 29 cooperate to convey the can bodies. The members 46 act as the support means associated with the conveyor chain 29. Accordingly, the members 46 must be in substantial diametric alinement with the chain 26. If the member 46 engages the outermost surface $S_o$ too far from such a diameter, the can body will not be retained in location. The exact line of engagement of the members 46 with successive can bodies is determined by the location of the member 46 on the presser lug 42 and the mounting of the chain 29. A desired line of engagement can be obtained by control of these variables.

Figure 14:
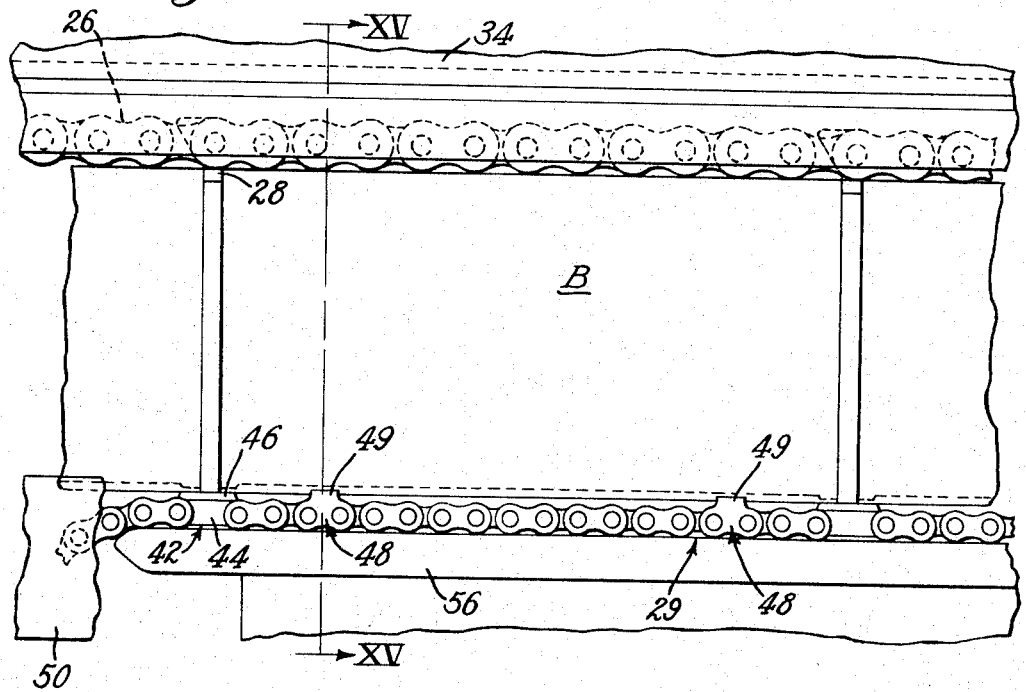
FIG. 14 is a detail view in side elevation on an enlarged scale and with portions partially broken away of a portion of a machine illustrating the preferred embodiment of the invention.
Figure 15:
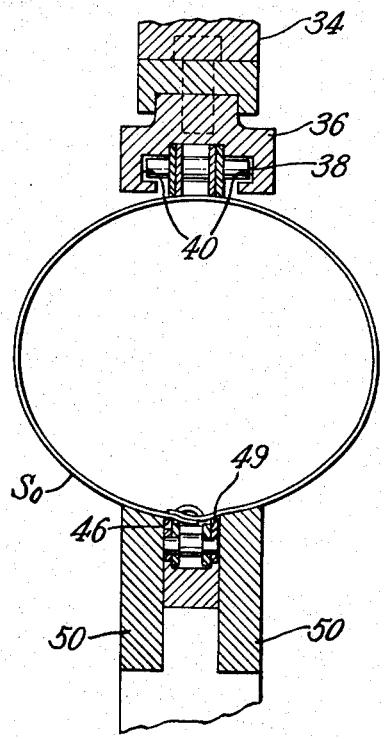
FIG. 15 is a sectional view taken along the line XIV—XIV of FIG. 14.

The preferred embodiment of the invention is illustrated in FIGS. 13 and 14. The support chain 29 is provided with stabilizing members 48 mounted on the chain 29 intermediate the presser lugs 42. The stabilizing members 48 comprise chain links having upstanding members 49 extending from one side thereof. The upstanding members 49 are engageable with can bodies introduced thereto along a line circumferentially disposed from the side seam on the opposite side thereof from the line of engagement of the presser lugs 42. The stabilizing members 48 act as can body supports in cooperation with the presser lugs 42 by applying a counterbalancing support force to ensure the stability of a can body introduced to the machine regardless of where on the engagement locus the members 46 engage.

The center-to-center spacing of the presser lugs 42 is the same as the center-to-center spacing of the feed dogs 28 on the conveyor chain 26. The length of the presser lugs 42 and members 46 is such that the members 46 are engageable with the trailing outermost surface $S_o$ of one can body simultaneously with the leading outermost surface $S_o$ of the succeeding can body. As viewed in FIGS. 3 and 4, the members 46 will be seen to extend upwardly from the links 44 a distance sufficient to support a can body after it no longer is supported by the spaced guide members 50 which constitute the egress support means associated with the solder applicator. The member 46 of a given link 42 initially contacts the trailing and leading ends of successive can bodies at a point intermediate the ends of the guide members 50, 50, as best shown in FIGS. 1 and 2. Upon egress from the guide members 50, 50, a can body is fixedly supported on the upstanding members 46 of two presser lugs 42 which cooperate with the conveyor chain 29 to progress the can bodies through the solidification stage to the removal station R comprising guide members 51. In the preferred embodiment discussed above, a can body would also be supported by the stabilizing members 48.

The universality and effectiveness of the structure delineated above can be best described by a discussion of the effect thereof on the various type laps. Furthermore, a comparison of the results derived therefrom with those of the apparatus of the previously referenced patent indicate the marked improvement represented thereby. FIGS. 6 and 7 represent laps fabricated on roll-form body-makers and wing-type body-makers, respectively. The lap shown in FIG. 7 is intended to depict a gap larger than that normally produced on wing-type body-makers in order to illustrate one of the deficiencies the subject invention remedies. It is to be noted, however, that enlarged gaps of comparable magnitude are often produced on wing-type body-makers as a result of fabrication inconsistencies.

FIGS. 8 and 9 illustrate the effect the compressor lug of the above referenced patent has on the laps illustrated in FIGS. 6 and 7. When the compressor lug of the referenced patent contacts the ungapped lap it produces a gap on the inside of the can body, see FIG. 8. The explanation for this result is as described above. When the reference's compressor lug contacts the lap having the enlarged gap it fails to close the gap completely, see FIG. 9. Furthermore, as discussed above, when a lap fabricated on a wing-type body-maker has a gap below the normal tolerance the compressor lug of the referenced patent produces a gap on the inside. This specific defect is not illustrated but would be somewhat analogous to the gap indicated in FIG. 8. Likewise, if a small gap were produced in a lap on a can body fabricated on a roll-form body-maker, the result would be the same, i.e. a gap on the inside of lesser magnitude than that shown in FIG. 8. Thus, it is readily apparent that the compressor lug taught by the prior art is limited to use with can bodies having a lap which is gapped within a relatively small tolerance. It is completely ineffectual on ungapped can bodies and produces unmerchantable can bodies where a gap without the prescribed tolerance exists.

The ability of the presser lug of the present invention to establish and/or maintain physical contact between overlapping layers of a lap is illustrated in FIGS. 10 and 11. The upstanding member 46 is shown to engage the outermost surface $S_o$ of a can body in alinement with the end $E_i$ of the inner lap layer 16. The outer lap layer 14 is urged upwardly into intimate engagement with the end of the inner layer. The remainder of the overlapped portion of the outer layer 14 is also urged upwardly but flexes as a result of the nature and thickness thereof and contact with the inner layer. That is, the amount of upward movement decreases progressively in the direction of the end of the outer layer. The end of the inner layer is essentially analogus to the end of a long, thin, flexible beam and reacts in accordance with what is commonly referred to as the bending beam theory. Upon the application of pressure to the end of the inner layer 16 by the member 46 through the outer layer 14, the inner layer is flexed or bowed and intimate contact is established between the inner and outer layers along the entire length of the overlap. FIG. 12 illustrates the effect of the member 46 on the laps described above, the view being enlarged and slightly exaggerated in order to show clearly the interaction between the members.

The interaction between the member 46 and the outer and inner layers of a lap results in the closure of gapped laps on can bodies fabricated on wing-type body-makers regardless of deviations from the normal gap tolerance. Furthermore, the contact between the layers of a lap formed on a roll-form body-maker is not vitiated as the initial application of pressure is transmitted to the end of the inner layer. That is, contact between the outer layer and the end of the inner layer is ensured by the initial pressure application and the remaining portions of the layers are fixed into engagement. Thus, it can be seen that means have been provided which can be utilized to establish and/or maintain physical contact between the layers of a lap regardless of the type body-maker employed. The problem of fabrication inconsistencies of body-makers has been solved. Ergo, a universal means for removing can bodies from the soldering station is provided which will close an existing gap or maintain contact between the layers of a closed lap.

The support chain 29 is supported by and moves in a guideway 56 (FIGS. 1, 2 and 3) and passes around sprocket wheels 58, 60. The wheel 58 is connected by an appropriate drive chain 62 to a gear reducer 64 which is connected by means not shown, to the sprocket 30 which rotates the conveyor chain 26. Tension in the chain 29 is controlled in a conventional manner by varying the position of a bracket 66 which mounts the wheel 58. The bracket 66 is adjustable by rotating a screw 68 threaded in a main supporting frame member 69 for the support chain 29.

In operation, the can bodies B are conveyed by the feed dogs 28 on the conveyor chain 27 in spaced end-to-end relationship with their seams in alignment at the bottom of the bodies. The length of the dogs, measured lengthwise of the chain 26, determines the space between the trailing edges of one can body and the leading edge of the next. After passing from the soldering means the can bodies move onto the guide members 50 and are squeezed vertically assuming elliptical shape under the pressure applied by the chain 26. While being supported on the guide members 50, the trailing end of one can body and the leading end of the next adjacent body are simultaneously engaged at or adjacent the leading and trailing laps 61 and 62, respectively, by a member 46 on the support chain 29. As stated above, the can bodies are engaged on the outermost surface $S_o$ in alinement with the end $E_i$ of the inner layer or at a point disposed circumferentially therefrom in a direction away from the end $E_o$ of the outer layer. The line defined by the points of engagement for a given presser lug construction is controlled by the positioning of the conveyor chain. Since the chains 26 and 28 are moving at the same linear speed, since the presser lugs 42 and dogs 28 are arranged on these respective chains to be in vertical alinement when the chains are parallel, and since the center-to-center spacing of adjacent presser lugs 42 is the same as that of the feed dogs, the desired relationship will be obtained as shown in FIG. 3.

The pressure produced at the outer layer 14 of the lap by the presser lug 42 causes the lap components 14 and 16 to be pressed into the desired close relationship with a thin layer of solder between them. If a gap existed between the layers of the lap when the can body was introduced to the machine, the gap is closed when the member 46 contacts the outermost surface $S_o$ of the cam body. Where no gap existed when the can body was introduced to the machine, the close relationship is maintained by the pressure applied by the member 46. Can bodies manufactured on either the wing-type or roll-form bodymakers can be soldered on the apparatus with the same conveyor chain.

Having thus described my invention, what I claim as new and desire to secure by Letters Patent of the United States is:

1. In a machine for soldering a tubular article having a seam including an interlocking portion and an overlapping portion comprising inner and outer overlapping layers, said machine comprising feed means for moving the article along a predetermined path of travel and means for applying solder to the seam, the combination of means cooperative with the feed means for feeding, aligning and producing pressure at the overlapping layers of the article to ensure a close relationship therebtween, said cooperative means comprising drive means having a plurality of presser lugs each engageable with the outermost surface of an article at a point spaced from the circumferential terminus of said outer overlapping layer.

2. In a machine for soldering a tubular article having a seam including an interlocking portion and an overlaping portion comprising inner and outer overlapping layers, said machine comprising feed means for moving the article along a predetermined path of travel and means for applying solder to the seam, the combination of movable means cooperative with the feed means for producing pressure at the overlapping layers of the article during movement to ensure a close relationship therebetween, said movable means comprising a plurality of presser lugs each having an upstanding member engageable with the outermost surface of an article at a point substantially alined with the end of the inner overlapping layer and spaced from the circumferential terminus of said outer overlapping layer.

3. In a machine for soldering a tubular article having a seam including an interlocking portion and an overlapping portion comprising inner and outer overlapping layers, said machine comprising feed means for moving the article along a predetermined path of travel and means for applying solder to the seam, the combination of means movable with the article for producing pressure at the overlapping layers of the article during movement to ensure a close relationship therebetween while the solder solidifies, said movable means comprising a plurality of presser lugs each having an extension member extending from one side thereof toward the article and engageable with the outermost surface of an article only at a point spaced from the circumferential terminus of said outer overlapping layer.

4. In a machine for soldering the side seams of can bodies having a side seam including an interlocking portion and at each end thereof overlapping portions comprising inner and outer overlapping layers, said machine comprising feed means for moving the bodies along a predetermined path of travel in spaced relationship, with their seams in substantial alinement, and means for applying solder to the seam, the combination of means cooperative with the feed means for feeding, alining and producing pressure at the trailing overlapping layers of one can body and the leading overlapping layers of the succeeding body during movement thereof to ensure a close relationship therebetween, said cooperative means comprising a plurality of presser members each engageable with the outermost surfaces of said successive can bodies along a line of engagement defined by points substantially alined with the circumferential ends of the inner overlapping layers and spaced from the termini of the outer overlapping layers.

5. In a machine for soldering the side seams of can bodies having a side seam including an interlocking portion and at each end thereof overlapping portions comprising inner and outer overlapping layers, said machine comprising feed means for moving the bodies along a predetermined path of travel in spaced relationship, with their seams in substantial alinement, and means for applying solder to the seam, the combination of means movable with the can bodies for producing pressure at the trailing overlapping layers of one can body and the leading overlapping layers of the adjacent body during movement thereof to ensure a close relationship therebetween while the solder solidifies, said movable means comprising a plurality of presser lugs each having an extension member engageable with the outermost surfaces of adjacent can bodies at points spaced from the circumferential termini of the outer overlapping layers.

6. In a machine for soldering a tubular article having a seam including an interlocking portion and an overlapping portion comprising inner and outer overlapping layers, said machine comprising feed means for moving the article along a predetermined path of travel and means for applying solder to the seam, the combination of means cooperative with the feed means for feeding, alining and producing pressure at the overlapping layers of the article to ensure a close relationship therebetween, said cooperative means comprising drive means having a plurality of presser lugs each engageable with the outermost surface of an article at a point spaced from the circumferential terminus of said outer overlapping layer and stabilizing members engageable with an article on the opposite side of the seam from the presser lugs.

7. In a machine for soldering a tubular article having a seam including an interlocking portion and an overlapping portion comprising inner and outer overlapping layers, said machine comprising feed means for moving the article along a predetermined path of travel and means for applying solder to the seam, the combination of movable means cooperative with the feed means for producing pressure at the overlapping layers of the article during movement to ensure a close relationship therebetween, said movable means comprising a plurality of presser lugs each having an upstanding member engageable with the outermost surface of an article at a point substantially alined with the end of the inner overlapping layer and spaced from the circumferential terminus of said outer overlapping layer and stabilizing members mounted on said movable means intermediate said presser lugs and engageable with an article at a point circumferentially disposed from the seam and on the opposite side thereof from the presser lugs.

8. In a machine for soldering the side seams of can bodies having a side seam including an interlocking portion and at each end thereof overlapping portions comprising inner and outer overlapping layers, said machine comprising feed means for moving the bodies along a predetermined path of travel in spaced relationship, with their seams in substantial alinement, and means for applying solder to the seam, the combination of means cooperative with the feed means for feeding, alining and producing pressure at the trailing overlapping layers of one can body and the leading overlapping layers of the succeeding body during movement thereof to ensure a close relationship therebetween, said cooperative means comprising a plurality of pressure members each engageable with the outermost surfaces of said successive can bodies along a line of engagement defined by points substantially alined with the circumferential ends of the inner overlapping layers and spaced from the termini of the outer overlapping layers and stabilizing members each engageable with a can body along a line circumferentially disposed from the side seam on the opposite side thereof from the line of engagement of said presser lugs.

9. In a machine for soldering the side seams of can bodies having a side seam including an interlocking portion and at each end thereof overlapping portions comprising inner and outer overlapping layers, said machine comprising feed means for moving the bodies along a predetermined path of travel in spaced relationship, with their seams in substantial alinement, and means for applying solder to the seam, the combination of means movable with the can bodies for producing pressure at the trailing overlapping layers of one can body and the leading overlapping layers of the adjacent body during movement thereof to ensure a close relationship therebetween while the solder solidifies, said movable means comprising a plurality of presser lugs each having an extension member engageable with the outermost surfaces of adjacent can bodies at points spaced from the circumferential termini of the outer overlapping layers, and stabilizing members each engageable with a can body on the opposite side of the side seam from said presser lugs.

No references cited.

RICHARD H. EANES, JR., *Primary Examiner.*